Figure 1:
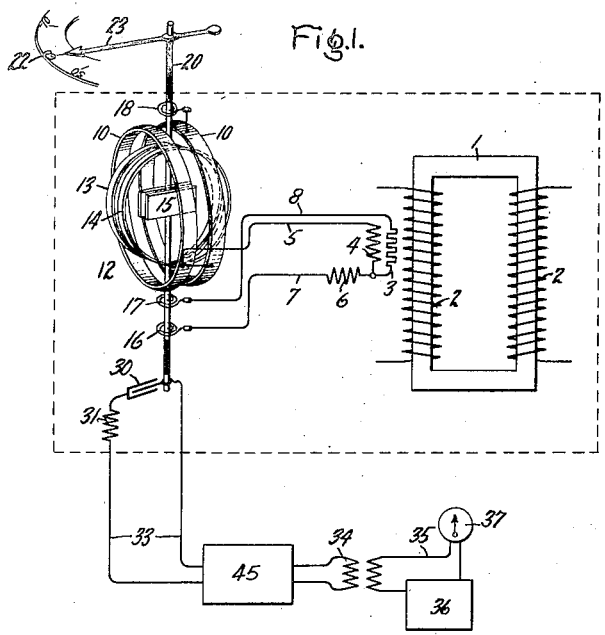

July 24, 1934. B. W. ST. CLAIR 1,967,911

HIGH VOLTAGE TEMPERATURE MEASURING APPARATUS

Filed July 22, 1931

Inventor:
Byron W. St. Clair;
by Charles E. Tullar.
His Attorney.

Patented July 24, 1934

1,967,911

UNITED STATES PATENT OFFICE 1,967,911

HIGH VOLTAGE TEMPERATURE MEASURING APPARATUS

Byron W. St. Clair, Lynn, Mass., assignor to General Electric Company, a corporation of New York Application July 22, 1931, Serial No. 552,443

2 Claims. (Cl. 73—32)

My invention relates to temperature measuring apparatus for operation at a high electric potential, such as is encountered in power transformers and the like, and is particularly concerned with that type of temperature measuring apparatus in which the temperature is determined from the electrical properties of a temperature responsive resistance element.

A simple form of such a temperature measuring device consists of a source of constant voltage and an ammeter in series with a temperature responsive resistance. The current flowing will be a function of the temperature of the resistance, and by proper calibration the ammeter will indicate temperature directly.

In applying such a temperature measuring device to high-voltage apparatus, difficulties are encountered which are in part due to the high voltage present. For reasons well understood in the art, it is often desirable to measure the hot spot temperature. This spot is usually on one of the current carrying conductors and may be on one of the high-voltage coils. A temperature responsive resistance element in thermal relation to one of these coils will assume a dangerous electric potential and must be insulated from the scale of the temperature indicating instrument. Formerly this has been done by connecting an expensive insulating transformer between the resistance and the indicating instrument. The function of the insulating transformer is to insulate the high potential current in the resistance element from the current of substantially ground potential which flows in the indicating instrument. One of the objects of my invention is to eliminate the necessity of employing an expensive insulating transformer between the temperature measuring instrument and the hot spot temperature resistance element which is placed in good thermal contact with and is therefore subject to the dangerous potential of the high-voltage winding. The entire instrument circuit is thus subject to high voltages, and in accordance with my invention is insulated from ground in general by the insulating facilities of the high-voltage apparatus. However, suitable provision is preferably made to obtain an indication of the temperature measurement on an indicating device properly protected from the high voltage. The temperature measuring instrument is preferably inclosed in the main transformer tank and provision made to transmit the indication to an external point.

Heretofore the operating voltage for the temperature measuring circuit has generally comprised a storage battery or other direct-current source or an insulated source of alternating current. Another object of my invention is to eliminate the necessity for this auxiliary source of supply, and in accomplishing this object I use alternating current in the measuring circuit obtained from the high-voltage electrical apparatus the temperature of which is being measured. This may be done by a coil or coils included in the measuring circuit which links with flux from the transformer, and any such coil may also comprise the temperature responsive resistance.

In carrying out my invention, I connect a source of alternating-current voltage across two resistance elements having substantially different temperature coefficients and use a ratio instrument such as shown in Patent 1,674,482, Rich, to measure the ratio of the currents flowing in the resistance elements. At any temperature the ratio of these currents is fixed although the magnitudes vary with the operating voltage. By this means I obtain a temperature indication which is substantially independent of voltage variations of the source of supply, and consequently variations in the main transformer voltage and flux are immaterial.

I may also provide the instrument with a shaft of insulating material which transmits the indication to an external scale. This effectively insulates the scale from the high potential of the temperature responsive resistance and high voltage transformer and eliminates the requirement of an insulating transformer. If desired, the instrument circuit may be connected directly to the high-voltage coil or they may be insulated for low voltages. Also, instead of indicating the temperature on a scale, it is possible to have the shaft of the instrument operate the transmitting condenser of a telemetric system such as shown in Patent 1,718,497 to St. Clair for remote indication.

Figure 2:
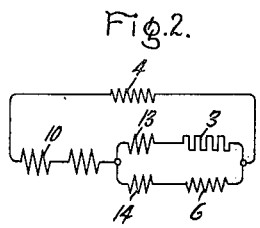

My invention will better be understood from the following description taken in conjunction with the accompanying drawing, in which Fig. 1 shows a schematic diagram in which the temperature measuring device is applied to a transformer and is used for both remote and direct indication. Fig. 2 shows the instrument circuit connections.

Figure 3:
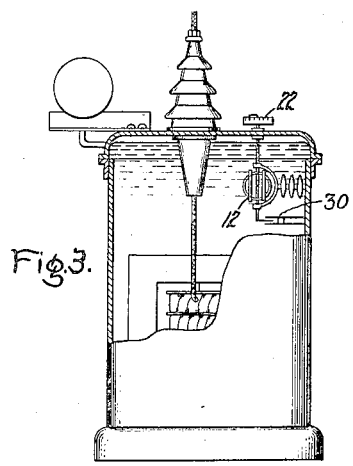

Fig. 3 illustrates in general how my invention may be applied to a high voltage power transformer.

In Fig. 1, the transformer, which may be of air blast or oil immersed type, is conventionally shown as consisting of a core 1, on which are wound coils 2. Temperature responsive resistance element 3 is non-inductively placed in thermal relation to the coil whose temperature is to be measured. The operating voltage is obtained from coil 4 which is diagrammatically shown in inductive relation to coils 2 of the transformer. This coil may be placed so as to link any desired component of the transformer flux, which may be either leakage flux or main flux.

A perspective view of a simple form of the dynamic type of instrument referred to above is shown at 12. This instrument has stationary field coils 10 and a rotor carrying a magnetic vane 15 and concentric field coils 13 and 14. Coils 13 and 14 are differentially connected in parallel with each other and in series with coil 10. When the components of current through coils 13 and 14 are equal, the rotor assumes a central position. An unbalance of the components of current in the movable coils causes the rotor to be displaced. In any position the displacement of the rotor depends on the ratio of the components of current in the movable coils and is substantially independent of the magnitude of the total series current flowing in the stationary coil.

To use such an instrument to measure temperature, it is necessary that the ratio of the currents in the movable coils shall be a function of the resistance of the temperature responsive element. Circuit connections for accomplishing this result are shown in Fig. 2. Temperature responsive element 3 is connected in series with rotor coil 13. A standard resistance 6 of a material having a substantially lower and preferably zero temperature coefficient is connected in series with rotor coil 14. Coil 4, in which the operating voltage is induced, is connected across coil 10 and the resistances 3 and 6 and coils 13 and 14 in parallel. With such connections, a change in the resistance of the temperature responsive element 3 changes the ratio of the currents in windings 13 and 14 which changes the deflection of the rotor element. With this arrangement of coil 4, it is unnecessary to wind the same about the adjacent leg of the transformer core, and in certain cases, this will be advantageous both from the standpoint of increasing the insulation factor of safety and from the standpoint of costs.

It is evident that since the instrument coils are directly connected to the temperature responsive element they will assume a substantial electrical potential. This would be dangerous unless satisfactory means for insulation between the instrument coils and scale were provided. In my device this insulation is provided by shaft 20 of insulating material projecting through the casing of the instrument. This shaft extends a safe distance to an appropriate scale 22, which in conjunction with pointer 23 serves to indicate the temperature. With this construction it is possible to locate the measuring instrument adjacent to the transformer with or without a casing of its own within the transformer tank. In the application to oil immersed transformers, the instrument 12 is preferably immersed in the oil while the scale 22 is located on the outside of the tank as indicated in Fig. 3.

Instead of operating a pointer for direct indication, it would be possible for the insulated shaft to actuate the transmitting condenser 30 of a telemetric system such as that shown in Patent 1,718,497 to St. Clair.

The telemetric system illustrated consists of a variable condenser 30 in series with inductance 31 forming the tuning circuit of a vacuum tube oscillator. Each value of capacity of the condenser and therefore each temperature indication corresponds to a definite oscillator frequency. This frequency is transmitted over lines 33 through an oscillator 45 to transformer 34 and receiver circuit 35, containing an amplifier 36 in series with frequency meter 37. It is obvious that by proper calibration the frequency meter will reproduce the indication of instrument 12.

Such other modifications and applications of my invention as fall within the true spirit and scope thereof are intended to be included within the scope of the appended claims.

What I claim as new and desire to secure by Letters Patent of the United States is:

1. In combination with high voltage alternating current induction apparatus, electrical temperature measuring means therefor requiring a source of electrical supply for its operation, and coil means responsive to leakage flux from said induction apparatus for supplying said temperature measuring means.

2. A temperature measuring device for alternating current electrical apparatus comprising a non-inductive temperature responsive resistance element in thermal relation to said apparatus, a resistance element of substantially zero temperature coefficient, a coil linked by a component of leakage flux of said apparatus for supplying a voltage to said elements and means to indicate the ratio of currents traversing the same.

BYRON W. ST. CLAIR.